(12) United States Patent
Roberts et al.

(10) Patent No.: US 7,009,595 B2
(45) Date of Patent: Mar. 7, 2006

(54) EXTENDED REFRESHABLE TACTILE GRAPHIC ARRAY FOR SCANNED TACTILE DISPLAY

(75) Inventors: John W. Roberts, Gaithersburg, MD (US); Oliver T. Slattery, Germantown, MD (US); Bretton Swope, Gaithersburg, MD (US); David W. Kardos, Sykesville, MD (US); Volker Min, Heiloo (NL); Michael Sutton, Welwyn Garden (GB); Edwin C. Mulkens, Uene (NL); Gina Rodgers, Chesapeake, VA (US); Nicholas Guttenberg, Gaithersburg, MD (US); Tracy Comstock, Cockeysville, MD (US)

(73) Assignee: United States of America, Washington, DC (US)

( * ) Notice: Subject to any disclaimer, the term of this patent is extended or adjusted under 35 U.S.C. 154(b) by 366 days.

(21) Appl. No.: 10/335,688

(22) Filed: Jan. 2, 2003

(65) Prior Publication Data
US 2003/0151597 A1    Aug. 14, 2003

Related U.S. Application Data

(60) Provisional application No. 60/346,152, filed on Jan. 3, 2002.

(51) Int. Cl.
*G09G 5/00*    (2006.01)
(52) U.S. Cl. ....................... 345/156; 715/702
(58) Field of Classification Search ............... 345/31, 345/108, 110, 156, 173; 434/112–114; 340/825.19, 340/407.1, 407.2; 341/21; 463/30; 382/114; 715/702, 701
See application file for complete search history.

(56) References Cited

U.S. PATENT DOCUMENTS

| | | | |
|---|---|---|---|
| 2,521,338 A | 9/1950 | Bryce et al. | |
| 2,549,632 A | 4/1951 | Nottingham | |
| 3,624,772 A | 11/1971 | Grunwald | |
| 3,736,672 A | 6/1973 | Skewis et al. | |
| 4,500,293 A | 2/1985 | Eltgen | |
| 4,551,102 A | 11/1985 | Meinzer | |
| 4,650,352 A | 3/1987 | Eriksson | |
| 4,836,784 A * | 6/1989 | Joachim | 434/113 |
| 5,195,894 A | 3/1993 | Le Blanc et al. | |
| 5,279,689 A * | 1/1994 | Shvartsman | 156/220 |
| 5,453,012 A * | 9/1995 | Hudecek | 434/114 |
| 5,636,038 A | 6/1997 | Lynt et al. | |
| 5,718,588 A * | 2/1998 | Tretiakoff et al. | 434/114 |
| 5,772,440 A * | 6/1998 | Ida | 434/114 |
| 6,109,922 A | 8/2000 | Litschel et al. | |
| 6,189,246 B1 | 2/2001 | Gorthala | |
| 6,354,839 B1 | 3/2002 | Schmidt et al. | |
| 6,417,821 B1 * | 7/2002 | Becker et al. | 345/31 |
| 6,692,255 B1 * | 2/2004 | Roberts et al. | 434/113 |
| 6,700,553 B1 * | 3/2004 | Becker et al. | 345/31 |
| 6,776,619 B1 * | 8/2004 | Roberts et al. | 434/113 |
| 6,819,228 B1 | 11/2004 | Gipson et al. | |
| 2002/0045151 A1 | 4/2002 | Roberts et al. | |

* cited by examiner

*Primary Examiner*—Kent Chang
(74) *Attorney, Agent, or Firm*—Harold A. Burdick (57) ABSTRACT

Apparatus and methods for extended refreshable tactile graphic display are disclosed, the apparatus including an array of pins at a display surface, with pin setting actuators and display surface matrix preferably being separable units. The display matrix is provided by stacked functional layers, functions including temporary pin retention and pin locking.

20 Claims, 4 Drawing Sheets

EXTENDED REFRESHABLE TACTILE GRAPHIC ARRAY FOR SCANNED TACTILE DISPLAY

RELATED U.S. PROVISIONAL PATENT APPLICATIONS

This application claims the benefit of U.S. Provisional Patent Application No. 60/346,152, filed Jan. 3, 2002, this application including portions of the written description pertaining to certain ones of the inventions described therein and making claim to those inventions.

FIELD OF THE INVENTION

This invention relates to graphic display apparatus and methods, and, more particularly, relates to such apparatus and methods that provide extended, refreshable graphic display.

BACKGROUND OF THE INVENTION

Many approaches for provision of tactile graphics are currently known and/or utilized. For example, tactile graphic embossers are commercially available, for example the Tiger Embosser by ViewPlusTech Corporation. Embossers provide permanent printout on consumable material such as paper or plastic, but do not provide refreshable display capability.

Approaches for providing refreshable arrays of tactile graphics (i.e., graphics that remain statically positioned as a user senses them, for example by movement of the hand in contact with the graphic display, but are able to be changed at the array surface after the user has sensed them) have also been heretofore suggested and/or utilized. One example is a Braille display using microvalves that direct air to inflate what are essentially small elastic balloons in a fixed matrix to form the Braille dots (by Orbital Research). The balloons in the matrix are placed in a pattern consistent with the dimensions of Standard Braille, the goal being to create an extended display with sufficient resolution to display Braille text which remains static as the user reads it. Since the balloons are part of the reading surface, they are well suited to Braille text. The reading surface has spaces between the dots where the balloons can be anchored, which may be less effective in a tightly spaced rectangular array. Continual application of power is required to keep the balloons inflated and the Braille text displayed (see U.S. Pat. No. 6,105,904 and http://www.orbitalresearch.com).

In another example, NASA Jet Propulsion Laboratory has specified a tactile display using an electroactive silicone polymer that contracts when subjected to an electric field. Cells of this polymer are attached to a rubbery film that forms the reading surface of the display. Application of an electric field to a cell causes the corresponding section of the rubbery film to be pulled down—the stimulus pattern is thus comparable to a photographic negative of the raised pattern that is to be displayed. The display appears to be two-level (all stimulus points either up or down). An actuator (electric field application) is needed at every stimulus point (i.e., cell). Continued application of electrical stimulus would be needed to maintain the displayed image (see Yoseph Bar-Cohen of Caltech, Technical Support Package NPO-20410, at http://www.nasatech.com/Briefs/Feb01/NP020410.html). Other approaches are known and have heretofore been utilized, including, for example, selectively magnetically active reading surfaces for setting and retaining code units (such as magnetized balls—see U.S. Pat. No. 4,551,102).

Extended tactile graphic arrays (a relatively large array of many movable units, such as pins, that create a textured surface that a user reads by moving the fingers over the surface) have significant advantages for certain specific applications compared to arrays smaller in scope. Since such an array is displacement-based, it creates a real tactile object which the user scans by finger motion (and thus dimensional accuracy must be maintained), which is the method most users are accustomed to. It allows use of arbitrary numbers of fingers on both hands (as well as the palms of the hands), does not require motion of the pins during the reading process (thus the possibility of low power consumption and the certainty of the geometric stability of the image being read), and can be implemented with lower density and less complex pin structures than those typically needed by the smaller displays. It is therefore desirable to find technology to make an extended refreshable tactile graphic array economically feasible, since cost has been the main impediment to implementation and to the development of commercial products.

While smaller scanned tactile graphic displays have many applications (see U.S. Pat. Nos. 2,521,338, 5,195,894 and 6,109,922 for examples), an extended tactile graphic array is likely to be used mainly for accessibility applications for blind and visually impaired users. Such arrays should therefore be optimized for accessibility uses, the simplest of which are line drawings, two-dimensional drawings with patterns/textures to differentiate objects being displayed, and Braille.

Refreshable tactile graphic displays based upon an extended tactile graphic array have heretofore consisted of a relatively large flat surface, with an embedded array of movable components (often movable pins are utilized) that can be moved in and out to form a pattern that the user senses by moving the fingers laterally across the surface. For best usability, the pin density must be high enough to permit the user to correctly interpret the depiction of edges and lines—an example might be ten to twenty pins per linear inch. The overall display surface must also be large enough to permit the depiction of reasonably complex graphic images. As a consequence of these two requirements, a usable extended tactile graphic array should have thousands to tens of thousands of movable components (pins).

Conventional approaches to implementation of such a pin array call for a corresponding array of thousands to tens of thousands of piezoelectric or other actuators, one per pin. The inherent cost of such a large number of small actuators and the cost of the power and control systems to operate them have made such a display extremely expensive (current actuators of this type cost at least several dollars each). In order to reduce cost, it is necessary to develop a technology that does not require a separate powered actuator for every pin. As evidenced by the foregoing, it will be appreciated that further improvement in the field of extended tactile graphic array for graphic display is needed.

SUMMARY OF THE INVENTION

This invention provides apparatus and methods for extended, refreshable display of graphics, and particularly provides an extended refreshable tactile graphic array for scanned tactile displays that accommodates both a Braille matrix and a closely spaced matrix for graphics, that does not require the application of power to maintain the displayed image once the stimulus points, or pins, have been set, that can be operated using conventional electromechanical actuators each operatively associated with plural stimulus points, and that can be adapted for multi-level (relief) display.

The apparatus includes a display surface having a pin array of at least hundreds of movable pins maintained. A pin retention mechanism (or mechanisms) is established adjacent to the display surface for holding pins in a position when moved. An actuating means selectively moves selected pins in the pin array between at least first and second positions, with a single actuator of the actuating means able to establish movement of multiple pins in the pin array.

Each pin in the array preferably includes a shaft between an enlarged head and an end. The display surface and pin retention mechanism(s) are preferably established by elements in a matrix of stacked elements, the display surface element having a user accessible display surface and an array of openings each having one of the movable pins maintained therein with the enlarged heads of the pins above the display surface and the pin ends below the display surface element. The actuating means is positioned to selectively contact the pin ends for moving pins maintained at the array of openings.

The method of this invention includes the steps of maintaining an array of at least hundreds of movable pins at a display surface and using a single actuator to move multiple pins in the array between at least first and second positions. Movement of the pins is continued until a desired configuration is attained at the display surface, pins being retained in a position when moved without continued influence from the actuator. When desired, the pins are again moved to attain a different configuration at the display surface.

It is therefore an object of this invention to provide improved apparatus and methods for extended, refreshable display of graphics.

It is another object of this invention to provide improved an extended refreshable tactile graphic array for scanned tactile displays.

It is another object of this invention to provide an extended refreshable tactile graphic array for scanned tactile displays that accommodates both a Braille matrix and a closely spaced matrix for graphics.

It is another object of this invention to provide an extended refreshable tactile graphic array for scanned tactile displays that does not require the application of power to maintain the displayed image once the stimulus points, or pins, have been set.

It is still another object of this invention to provide an extended refreshable tactile graphic array for scanned tactile displays that can be operated using conventional electromechanical actuators each operatively associated with plural stimulus point.

It is still another object of this invention to provide an extended refreshable tactile graphic array for scanned tactile displays and that can be adapted for multi-level (relief) display.

It is yet another object of this invention to provide an extended refreshable tactile graphic array apparatus for tactile display that includes a display surface having a pin array of at least hundreds of movable pins maintained thereat, pin retention means for holding pins in a position when moved, and actuating means for selectively moving pins in the pin array between at least first and second positions, a single actuator of the actuating means for moving multiple pins in the pin array.

It is yet another object of this invention to provide an extended refreshable tactile graphic array apparatus for scanned tactile display including a multiplicity of movable pins, each pin including a shaft between an enlarged head and an end, a matrix of stacked elements including a display surface element and a pin retention element for holding pins in a position when moved, the display surface element having a user accessible display surface and an array of openings each having one of the movable pins maintained therein with the enlarged heads of the pins above the display surface and the pin ends below the display surface element, and actuating means for selectively contacting the pin ends for moving pins maintained at the array of openings at the display surface element between at least first and second positions, a single actuator in the actuating means for moving a number of the pins.

It is yet another object of this invention to provide a method for extended refreshable tactile graphic display that includes the steps of maintaining an array of at least hundreds of movable pins at a display surface, using a single actuator to move multiple pins in the array between at least first and second positions, continuing to move the pins until a desired configuration is attained at the display surface, retaining pins in a position when moved without continued influence from the actuator, and moving the pins when desired to attain a different configuration at the display surface.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
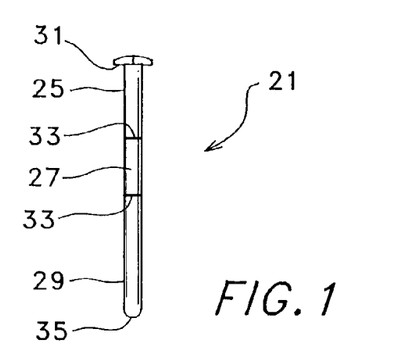
FIG. 1 is an illustration of a pin used in the tactile graphic array of this invention.

The apparatus of this invention will be described with reference to the FIGURES. For use with the approaches taught herein, pins 21 as shown in FIG. 1 may be utilized. Pins 21 are oriented perpendicular to an extended reading (or sensing) surface 23 (such as illustrated in FIGS. 2 through 4 and 6, and wherein hundreds of pins are utilized as a minimum), and are raised or lowered (moved perpendicular to the reading surface) to form the tactile graphic images. The portions of the pin that may be of interest are top portion 25 (the end that the user touches during the reading process), shaft 27, and bottom portion 29 (the end that is always below the reading surface, that the user never touches). Top portion 25 of pin 21 must meet a number of performance requirements. It must allow smooth lateral motion of the reading fingers, and the shape must be chosen so that the pin does not feel unduly sharp, and so that the fingers are unlikely to catch on the edge of a pin when moving from an area where the pins are lowered to an area where the pins are raised. The shape of top portions 25 must also facilitate the user's ability to interpret a sequence of raised pins as a continuous line or curve rather than as a set of unrelated points.

Top portions 25 of pins 21 thus preferably include rounded heads 31 that are larger than shafts 27 of the pins, similar to the heads of round-headed nails. Heads 31 are relatively positioned at surface 23 of the display apparatus of this invention sufficiently close so that heads 31 of pins 21 nearly touch. This design permits a large radius of curvature of heads 31 relative to pin spacing to allow smooth finger motion and discourages fingers catching on the edges of raised pins, provided that the maximum displacement of adjacent rows of pins is less than the height of the rounded heads. Shafts 27 of pins 21 may still be relatively narrow, providing clearance for the action of the setting and locking mechanisms as hereinafter discussed.

Pin shafts 27 preferably include features to facilitate the action of the setting and locking mechanisms. Such features are desirable alternatives to purely friction-based mechanisms, which may be particularly prone to slippage and wear. Examples of such features include ridges or grooves 33 around the shaft. Grooves around the shaft are simple to implement in a blank shaft that is already at the desired diameter. Ridges around the shaft can be implemented by a screw machine or in a pressing operation, and do not significantly weaken the shaft. For both grooves and ridges, the shape and dimensions must be carefully chosen to interact properly with the operating mechanisms.

Bottom portions 29 of pins 21 are of interest only to the extent they play an active role in the operation of the display. In one embodiment of the apparatus of this invention, pins 21 are set by operation of the actuator against the bottom portions 29 of the pins, and the nature of the actuation requires a rounded pin tip 35 with radius of curvature equal to the radius of shaft 27.

Figure 2:
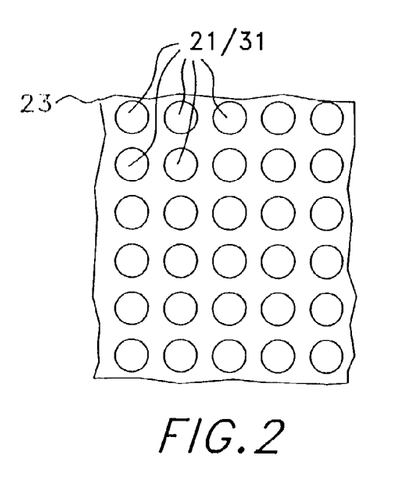
FIG. 2 is a diagrammatic illustration of a portion of a first embodiment of an extended pin array used in the tactile graphic array of this invention.
Figure 3:
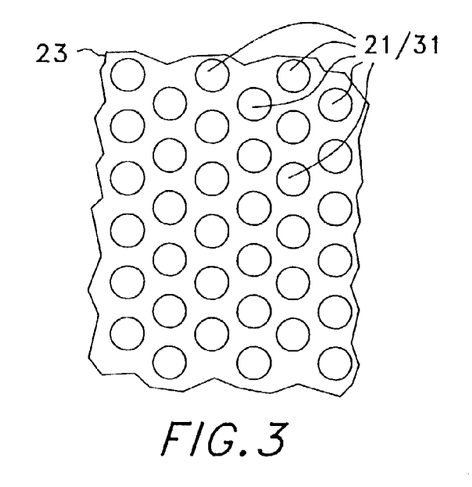
FIG. 3 is a diagrammatic illustration of a portion of a second embodiment of an extended pin array used in the tactile graphic array of this invention.

Several different pin array configurations could be utilized at surface 23, configuration of the pin array chosen taking into account the needs of the intended applications as well as the simplicity of implementation. A uniform rectangular array of pins (as illustrated at FIG. 2) is the most versatile, is easy to implement, and can be effectively driven by a wide variety of scanning mechanisms. A staggered array configuration (as illustrated at FIG. 3) offers greater pin 21 density relative to the diameter of pin heads 31, and thus produces a more realistic tactile reproduction of geometric forms than a rectangular array. The offset of the pins in such an array must be taken into account in the pin driving algorithm.

Figure 4:
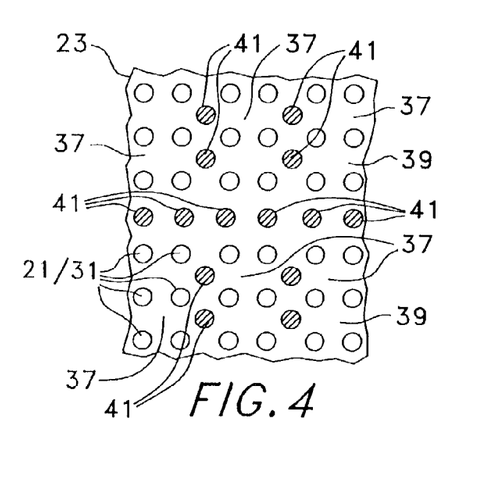
FIG. 4 is a diagrammatic illustration of a portion of a third embodiment of an extended pin array used in the tactile graphic array of this invention.

For specific applications, more complex (non-rectangular) array designs would be desirable. Referring to FIG. 4, one particularly useful example, used for Standard Braille text, requires different dimensions for the spacing of dots within a Braille character 37, for the spacing between Braille characters in a line, and for the spacing between lines 39 of Braille text. If a primary intended application of an extended tactile graphic array includes the display of Braille text (with or without graphics as a secondary application), then there would be an advantage to placing pins to exactly correspond to the dot positions in Braille text (utilizing pins 41 to somewhat fill in the matrix when it is being used for graphic applications). Such an array would be highly effective for displaying standard-dimension Braille text. Again, driving algorithms of greater complexity would of necessity be utilized.

Figure 5:
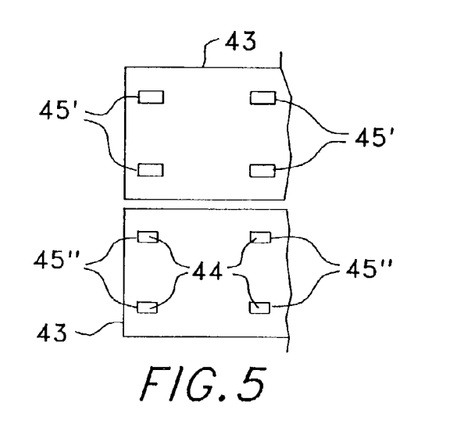
FIG. 5 is a diagrammatic illustration of a portion of a pair of plates in a stacked configuration of the tactile graphic array of this invention.
Figure 6:
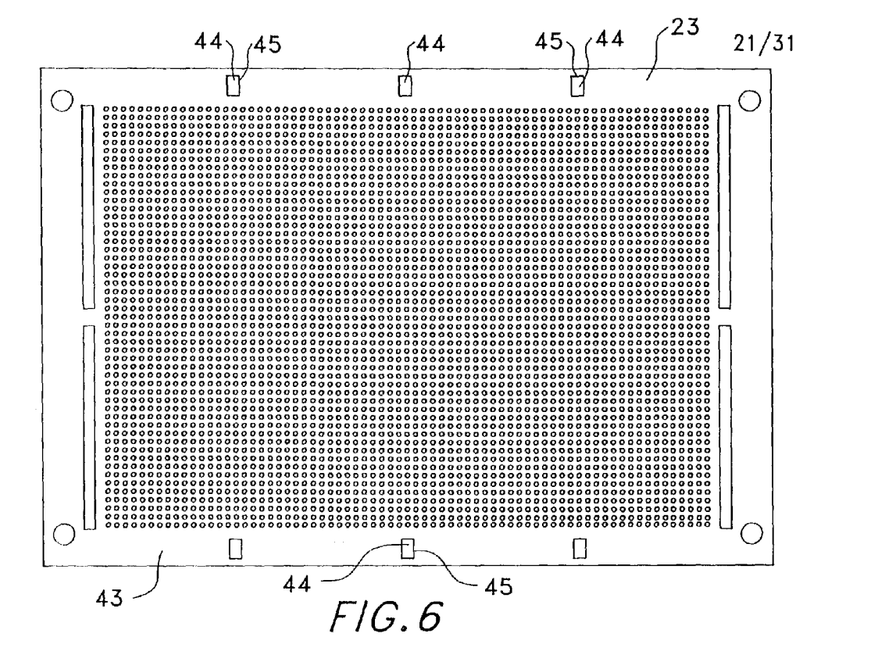
FIG. 6 is a top view illustration of a single plate of the stacked configuration of the tactile graphic array of this invention.

In the apparatus of this invention, extended tactile graphic array requires the functions of setting pins 21, retaining the pins in the desired configuration, and resetting pins 21. A configuration of stacked elements is preferred to implement these functions. The overall display is designed in multiple layers 43 (shown in FIG. 5 laid side by side, it being understood that in operation the layers are stacked one atop the other and that more than two layers, depending on function, may be utilized), where each layer 43 performs one or a small number of specific display functions, and each layer 43 has a relatively simple mechanical configuration. Layers 43 are stacked together and pins 21 installed to form the completed display surface 23. Registration of the layers can be assured by mounting all the layers 43 on shafts 44 that extend through all the layers 43 at openings 45, or by inclusion of tongue and groove structures in some of the layers 43, in the non-display areas of those layers. In cases where a layer 43 is required to move laterally with respect to the other layers 43 (for example, a locking layer), openings 45 that align that layer to alignment shafts 44 or tongue and groove structures can be elongated slightly, to permit just the necessary amount of lateral motion (as discussed hereinbelow) of that layer relative to the other layers (see enlarged openings 45' relative to openings 45" in FIG. 5, for example).

Figure 7:
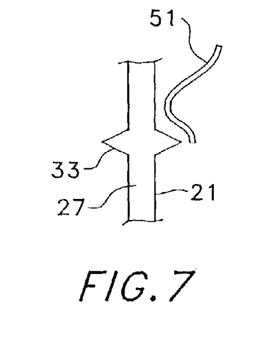
FIG. 7 is a schematic illustration showing one method of pin position retention for use with the tactile graphic array of this invention.

In an extended array design where each pin actuator controls multiple pins, pin retention mechanisms are preferred to hold each pin 21 in place at times when an actuator is not driving it. One approach is pressure-based device (such as a spring clip) 51 as shown in FIG. 7. The actuator chosen must exert sufficient force to move pin 21 against the force of the pressure-based device (e.g. spring clip) 51 exerted at ridge 33 of pin 21, and the pressure-based device holds the pin in its new position firmly against shaft 27 and ridge 33 (enough to prevent it from being moved by the pressure of the fingers reading the display). After the displayed image has been read, pins 21 may be reset by forcing them back against the force of pressure-based device 51.

Another, preferred, approach to pin retention is a two-stage pin retention system. As the pins are set, a temporary pin retention mechanism holds the pins firmly enough to keep them in the position where they were set, but not firmly enough for reading by the user. After the pins have been set to the desired configuration, a locking mechanism holds the array of pins firmly in place, permitting reading by the user. When the time comes to reset the display, the pins are first unlocked to allow free movement. (The temporary pin retention mechanism may also be released during reset, depending upon implementation, but this may not be necessary because of the relatively low forces required to move the pins against the force of the temporary pin retention mechanism).

Two-stage pin retention mechanisms, while more complex than the single-stage approach described above, have the following advantages: 1) less force is required to set the individual pins, 2) the pins can be held firmly while the user is reading the display, 3) less energy is required to operate the display, 4) less force is required to reset the pins (which is important when there are a large number of pins to reset in a short period of time), and 5) wear of the pins and locking mechanisms is reduced.

As part of the two-stage pin retention mechanism, the purpose of temporary pin retention is to hold the pins that have been set and the pins that have not been set in their correct respective positions during the process in which the selected pins are set. The temporary mechanism thus holds the pins against the influences of gravity, electrostatic attraction, light incidental contact, and acceleration (jarring or shaking) to which the display may reasonably be expected to be subjected. At the same time, it is desirable that this mechanism not require unduly high force for setting or resetting the pins, and that it have little tendency to wear or to cause wear in the pins or other display components. The mechanism may be configured to release entirely during display reset, though this capability may add unwanted complexity to the display design.

Figure 8:
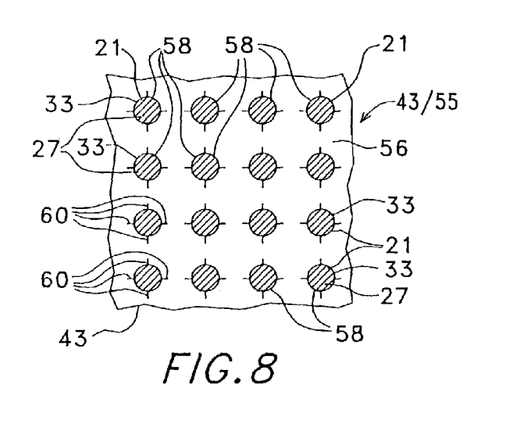
FIG. 8 is a schematic illustration showing a second method of pin position retention for use with the tactile graphic array of this invention.

One example 55 of a temporary pin retention mechanism is shown in FIG. 8 (with the pin heads cut away), and includes flexible sheet 56 (and would also comprise a layer 43 in a stacked array). A sheet of material that is strong and flexible but with low elasticity (e.g. MYLAR) is included as a component of the matrix that holds pins 21, positioned so that a feature on each pin 21 (for example head 31 or a ridge 33 on shaft 27) forces part (at openings 58) of flexible sheet 56 to bend or stretch slightly to allow passage of the feature whenever a pin 21 is set or reset. Openings 58 in flexible sheet 56 through which the pins pass may be holes only slightly larger than pin shaft 27 (so that the passage through the hole of any portion of the pin with larger diameter causes the flexible sheet to stretch), or openings 58 may include cuts 60 thereat in flexible sheet 56 radial to the surface of an opening 58, effectively forming tabs of the material of flexible sheet 56 that flex to allow passage of larger-diameter portions of pins 21. In either event, a pin that is set or reset pops through the flexible sheet, and is held in place by the force that would be required to pop it back. When used in a multi-level display (accommodating setting of multiple pin heights), it is expected that either a separate sheets 56 in a layer 43/55 or multiple pin structures at each pin 21 (e.g. ridges 33) will be required for each set level.

Alternatively, compressible (springy) material could be utilized for temporary pin retention. An example of this would be a thin foam plastic sheet of foam with very fine cell structure or the like. A sheet of this material can be included in a layer 43 of the matrix of layers holding the pins, and positioned so that the material contacts either the smooth shafts of the pins or a textured surface on the pins. Pin retention is accomplished by means of friction between the pins and the sheet of material. With the use of a sufficiently thin sheet of material, tendency of the pins to spring back after being set or reset can be minimized. This approach would be useful in multi-level displays, since one sheet of material can be configured to support multiple pin displacements.

A third approach to temporary pin retention would utilize high viscosity liquid or plastic material. The pins and a corresponding layer 43 in the pin holding matrix are made to contact a material (e.g. petroleum-based grease or silicone) that allows setting and resetting motion of the pins, but holds them lightly due to the viscosity of the material. Such an approach requires means to prevent the flow of the material to portions of the display where it is not wanted (e.g. embedding it in a fabric), and prevention of contamination of the material by abrasives (which could cause wear) or other substances (by limiting access to the environment and by selection of material for resistance to contamination).

Figure 9A:
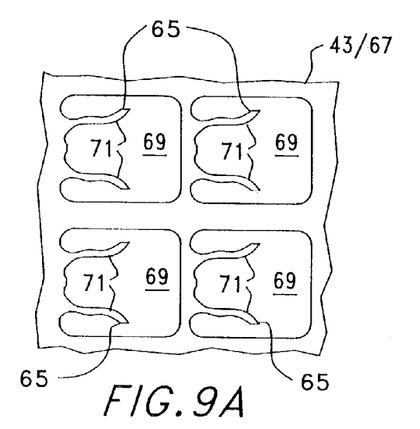
FIGS. 9A and 9B are schematic illustrations showing additional embodiments of pin position retention mechanisms for use with the tactile graphic array of this invention.
Figure 9B:
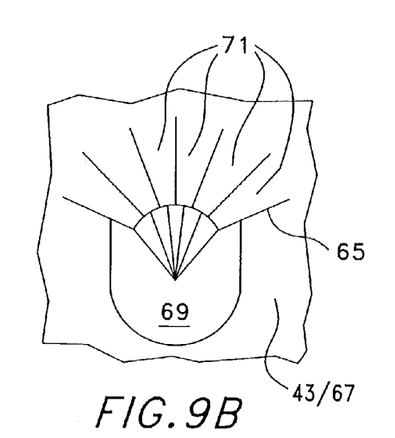

An approach to temporary pin retention utilizes flexible clips 65 in a thin sheet array 67 of high strength material mounted in the pin holding matrix of layers in a way that permits a small degree of lateral movement (two different embodiments of which are shown in FIGS. 9A and 9B). This approach also may be utilized for pin locking during reading. A controlling mechanism (manual or automatic) sets array 67 in one of several positions depending on the function being performed by the display. An example would be a three-position locking mechanism. The sheet has holes 69 to allow the motion of the pins each defining a spring-like or clip-like structure 65 made out of the material of array 67 and associated with each of the holes 69. The clips engage features (heads, ridges, or grooves) on pins 21.

Figure 13:
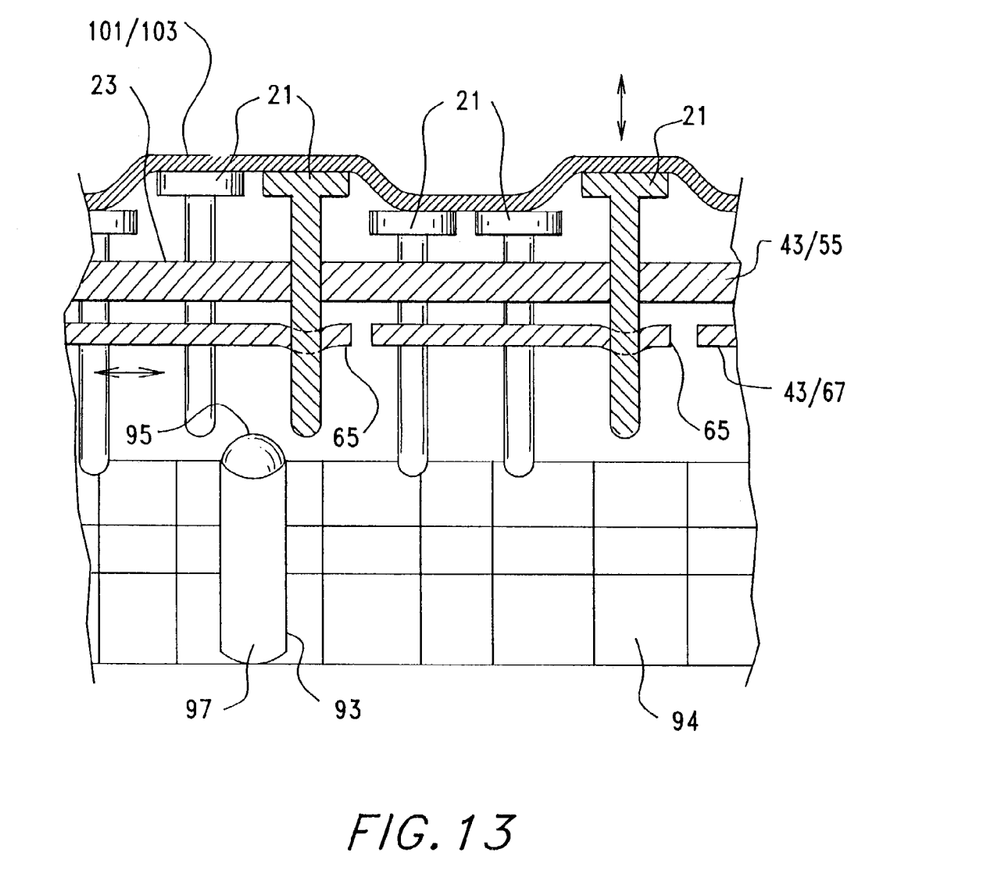
FIG. 13 is a partial sectional diagrammatic illustration of apparatus in accord with this invention.

For the three-position design, sheet array 67 is positioned in an intermediate position during the pin setting process, so that clips 65 lightly engage pins 21, and the pins that are set move frictionally past the clip arms 71 and are held temporarily thereby. After the pin setting process is completed, sheet array 67 is shifted laterally to a second position where the clips firmly hold the pins in place (i.e., the pins are locked in position) to resist finger pressure as the user reads the display. During reset of the display, the sheet may be shifted back to the intermediate position to lightly engage the pins, or to a third position where the clips are completely disengaged from the pins (the third position can be used if the display is always positioned so that gravity will hold the pins in the reset position until the writing process begins). Flexible clips offer the benefit of providing two functions (temporary retention and locking) in one layer of the display though two layers may still be desired (as shown in FIG. 13).

Pin locking is based on the application of a small amount of force (from a source other than the actuators that set the pins) to engage a mechanical interlock that holds the pins firmly in place and resists finger pressure while the user reads the display (such as clips 65 discussed above). Because of the close spacing of the pins and consequent small dimensions of the pin features, the actual travel distance of the interlock mechanism may be very small—less than the distance between pins. Mechanical stability can be provided by configuring the interlock mechanisms for all the pins onto a single sheet, which is incorporated in the stack that forms the pin matrix, and which is allowed to move laterally a sufficient distance to engage and disengage the interlock. Because thousands of pins may be engaged or disengaged simultaneously, the force to engage or disengage each pin must be relatively small. Because the distance for the interlock mechanism is small and relatively high precision of motion is required, it is desirable for the actuator that controls engagement and disengagement of the interlock to operate through a precision linkage in which a large motion of the actuator results in a small motion of the interlocks (not shown). This configuration also serves to amplify the force applied to the interlocks, and reduces the resistance the actuator must provide to disengagement of the interlocks during times the user is applying force to the pins while reading. A buckle mechanism would be an example of a linkage that provides considerable mechanical advantage when engaging, and considerable stability when fully engaged.

When the pins are being set during the writing process, there is a risk that a small number of pins will not be moved fully to the positions desired, and will remain in intermediate positions. Depending on the configuration of pin and interlock mechanism, a pin in an intermediate position could interfere with the proper operation of the interlock mechanism by requiring excessive force for interlock to occur, or by causing damage to pin or interlock mechanism. A small number of incorrectly set pins could potentially interfere with the ability of the locking mechanism to correctly lock the remainder of the pins. This can be avoided by shaping the pin and interlock features to minimize the likelihood of jamming, and by providing resilience in the interlocks or the drive mechanism to minimize the damage caused by jamming and to permit correct locking of pins that have been set to the correct positions.

Many possible interlock methods involve contact with pins 21 that is primarily on one side of the pin, because the motion of the locking mechanism causes the interlock to press against the pin on that side. If a larger contact area or more symmetric locking is desired, two interlock mechanisms (for example two sheets with attached or integrated interlock features) can be provided that move in opposite directions, so each pin is contacted by two locking mechanisms on opposite sides. This approach requires two locking layers 43 in the stack that makes up the pin holding matrix of layers.

Figure 10:
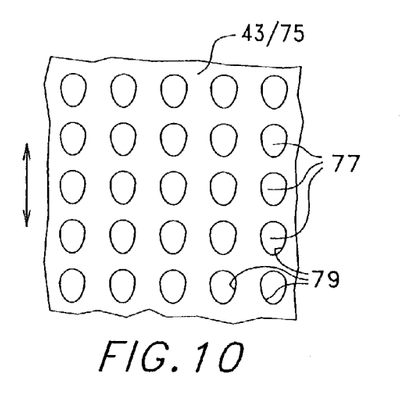
FIG. 10 is a diagrammatic illustration showing one means of pin position locking for use with the tactile graphic array of this invention.

Beside clip sheet array 67, a layer 43 including sheet 75 having oversize round or ovoid holes 77 therein could be utilized for pin locking (see FIG. 10). Pins 21 pass through round or oval-shaped holes 77 of sheet 75 that are larger in diameter than shafts 27 of the pins. In the unlocked position, the pins can move in and out of the matrix (i.e., perpendicular to display surface 23) without contacting edges 79 of holes 77. When sheet 75 is shifted laterally to the locked position, edges 79 of the holes closely contact the pins, and ridges, grooves, or other features on the pins are prevented from moving through the holes in the sheet. Oval-shaped holes (with small radius of curvature matching pin shaft 27 radius) have an advantage over round holes, because when the pins are locked at this point, a larger fraction of the circumference of the pin is contacted by the locking mechanism than would be the case with oversize round holes.

Figure 11:
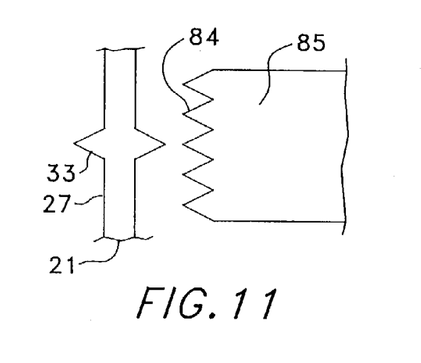
FIG. 11 is a diagrammatic illustration showing a second means of pin position locking for use with the tactile graphic array of this invention.

FIG. 11 shows yet another example of a pin locking mechanism that may be employed, wherein compressible material such as rubber is utilized. The use of a compressible material such as rubber as part of the locking mechanism is attractive because it minimizes the effects of jamming, and prevents locking problems with one pin from interfering with the locking of the other pins. The main concerns with this use of compressible material would be slippage and wear. For example, pressing a rubber sheet against the smooth shafts of the pins may permit the pins to slip, and if they slip they will contribute to the wear of the rubber material. To minimize the slippage that can result in wear, it is desirable in this embodiment to use jagged interlocking edges on pins 21 (ridges 33 may be thus shaped) in combination with interlocking edges 84 at locking sheet layer 85, so that once the lock is fully engaged, the pins are prevented from sliding against the sheet. Dimensions should be selected so that if a pin is not correctly positioned, and the features on the pin and the locking sheet do not properly line up, then either the pin will move slightly (but not enough to cause significant wear) until the features line up correctly, or else the compressible material will compress to the extent that the pin is held in its then current position, and none of the display components suffers damage.

The compressible material can be a component of locking sheet layer 85, though the overall structure of the sheet must be rigid enough to apply uniform pressure to all of the pins in the display. The locking sheet can be made of compressible material, with an internal support frame of rigid material. Alternatively, the locking sheet can be made primarily of rigid material, with compressible material attached just at the openings where it contacts the pins.

Another pin locking alternative would be to place a textured structure such as ridges of compressible material on the shafts of the pins for contact at openings in a locking layer 43.

A rotary pin retention approach could also be utilized. Utilizing this approach, pins 21 would each have individual locking structures built into them that interact with the surrounding matrix when the pins are individually rotated. An example of this approach would be pins that are threaded part way along the shaft, mounted in a threaded matrix. Rotating a pin along its axis in one direction causes the head of the pin to extend by an amount proportional to the angle of rotation. Another approach uses a cross-piece in each pin (oriented perpendicular to the axis of the pin) that can be rotated with the pin to lock in slots (parallel to the surface of the display) to hold the pins at one or more heights. The control system keeps track of the current positions of all the pins, and returns them all to the default position when resetting the display.

A click-lock device could be utilized and adapted so that a button on one end that is clicked once extends a tip from the pin, the tip being retracted when the button is clicked a second time. A similar design approach can be used for setting and resetting the pins in an extended array tactile graphic display.

A feature of the pin locking mechanisms hereinabove described is that they provide for incremental drawing capability. In accessibility applications, it is often useful to be able to draw part of a tactile figure, allow the user to read the tactile image, then add to the tactile drawing and permit a second reading, and so on. Two main uses for incremental drawing are: 1) in the presentation of complex tactile images, where the basic features are drawn first then details added, to aid the user in interpreting the image, and 2) in design work, where the user specifies incremental changes to the drawing. As may be appreciated, the two-stage pin retention approach supports incremental drawing since, while the pin locking mechanism is released, temporary pin retention holds previously set pins in place, allowing additional pins to be set before the pin locking mechanism is once again shifted for engagement and locking of the pins.

Pin setting and resetting for the apparatus of this invention utilize approaches that reduce the number of actuators needed by a very large factor compared to heretofore known devices and include a one-dimensional scanned actuator array. Each of the various approaches taught herein has its own advantages and, thus, applications for which it is most effective.

A first embodiment utilizes a one-dimensional scanned array of actuators with spacing matching that of the pins. The array is passed across the display (e.g. contacting the bottom portions 35 of pins 21) and each actuator sets the selected pins that it encounters. The entire display is written in a single pass, and the number of actuators needed to set the pins is greatly reduced. For example, in a display with an m by n array of pins, and an m×1 actuator array, the number of actuators needed is 1/n of the number needed using the conventional approach of one actuator per pin. The additional time needed to scan the actuator array across the display will not be an issue for many applications, since the tactile reading of two-dimensional images is a relatively slow process. This approach requires precision 1-dimensional tracking of the actuator array and placement to align it with the pins that each actuator must control.

Raster scanning of the display could be utilized. A monochrome CRT (cathode ray tube) monitor uses an electron beam that sweeps across each row of the visual display in turn, until all the rows have been traced, allowing one beam to drive every pixel in the display in sequence. A similar approach can be used in setting pins 21 in the extended array tactile graphic display of this invention, wherein one actuator is moved across all the pins in the display, setting the selected pins to form a pattern. Since there may be many thousands of pins and the mechanical setting process is much slower than the writing process of an electron beam, the process may be speeded by raster scanning using a 1-dimensional array that in length is an integer fraction of one of the dimensions of the pin array. For example, in a display of m rows and n columns, an m/8 by 1 array of actuators can scan ⅛ of the rows at a time, so that the entire display is written in 8 passes. Raster scanning requires precision 2-dimensional guidance of the actuators.

Another approach utilizes vector drawing. Most tactile graphic drawings for accessibility place an emphasis on lines and curves, since these are easier to interpret using the sense of touch than area fills. It is possible to take advantage of this tendency by designing a tactile graphic display that employs vector drawing methods to set pins 21, with as little as one actuator setting all the pins for the drawing. Rather than systematically scanning all the pins on the display, the drawing is specified in terms of a set of lines and curves (vectors), and the actuator is made to draw out these lines and curves on the display by following the vectors and setting the pins that are encountered. The vectors are followed using a precision 2-dimensional guidance system comparable to that of a 2-dimensional graphic plotter used for making visual plots on paper. Selected pins can be explicitly set by precision placement of the actuator, or the actuator can be made to set all those pins it happens to encounter in its passage. The latter method works especially well if the writing process is performed by pressing against the ends of the pins opposite the ends that the user reads, and facilitates very fast vector writing of the image (since the positioner does not have to pause at each selected pin). It also facilitates scaling of images to larger or smaller sizes, since it is not necessary to calculate in advance a mapping between the vectors needed and the physical placement of the pins in the display (though such calculation may result in an improved tactile graphic image).

When using the vector drawing approach, the time to complete a drawing is no longer a constant: it becomes proportional to the complexity of the drawing. The drawing is a set of straight or curved vectors, each of which is made by positioning the actuator at the starting point, engaging the actuator, following the specified vector, then disengaging the actuator. This approach lends itself very well to incremental drawing (described above), since individual increments that involve a few vectors may take a very short time to write compared to the time needed to scan the entire display. If the source imagery is not in vector form, then the display driving algorithm must include the capability to efficiently transform other image formats to vector form. There are image processing programs currently commercially available that can be adapted to perform this function. Vector conversion may include the introduction of brief delay cycles in the drawing vectors to ensure that the drawing speed does not exceed the speed capability of the display components.

Figure 12:
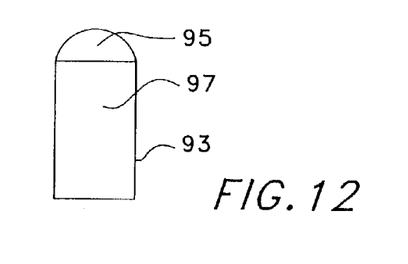
FIG. 12 is a diagrammatic illustration of a roller for high speed vector drawing used in pin setting with the tactile graphic array of this invention.

Tactile graphic vector drawing can be conducted using a tracker 93 either hand operated (in the simplest mode of operation) or mounted at a precision 2-dimensional guidance system 94 and having a freely rotating metal ball 95 maintained in the end of tube 97 (similar in structure to the tip of a ballpoint pen) to press against the pins on the back of the display when the actuator is engaged (FIGS. 12 and 13). The diameter of the ball determines the number of pins that are expected to be set with any arbitrary motion of the tracker, and thus the solidity and thickness of the tactile line to be drawn. A thicker line can be drawn by multiple passes of tracker 93 with a slight offset of ball 95 for each pass.

Alternatives to the roller ball tracker 93 are a precision actuator tip that contacts selected pins individually (provides greater precision, but slower drawing), and a tip that vibrates with sufficient amplitude and sufficiently high frequency that it impacts and sets all the pins along the vectors being drawn.

The section above on pin locking describes the desired mechanical properties of the control for the pin locking mechanism—the need for precision motion control of the locking mechanisms for all the pins, moved all together for a very short distance, with the need for the locking mechanism to remain stable during the reading process. For a powered display, an actuator can provide the needed force to engage and disengage the lock, and can be controlled by the same control system that operates the other components of the display. Because reading may often be a lengthy process and the user may sometimes want a particular image to be displayed for a long period of time, it is desirable for retention of the lock to be performed by the mechanical linkage to the locking mechanism, so that the pins remain locked (and the image is retained) with no additional application of power once the lock is engaged.

When the time comes to reset the display, the pin locking mechanism is disengaged, and all the pins must be reset, possibly requiring force to overcome the effect of the temporary pin holding system. A device that engages all of the set pins of the display and moves them to the reset position is one approach, and could be made as part of the locking mechanism. This can be accomplished by including a plate in the array stack that can move vertically (perpendicular to the plane of the display) as well as horizontally, and has ovoid holes or other mechanism to catch the pins—for reset, the plate would be moved horizontally to catch all the pins that have been set, then vertically to move the pins to the reset position. A simpler approach is a roller or similar device that passes over reading surface 23 of the display apparatus and pushes all the pins to their lowest possible position. In a computer controlled display, the action of the resetting device can be controlled by the overall control algorithm of the display. If the resetting device contacts the parts of the display where the users put their fingers, it is desirable to include a guard to prevent the users' fingers from being caught in the resetting device. A safety interlock can also help in the prevention of injury or damage to the display.

Tactile graphic images embossed on paper or plastic represent a well-known and popular medium. Embossed images are somewhat different from tactile images formed by discrete pins, because in an embossed image the paper or plastic sheet forms a continuous connection between adjacent points (similar in concept to the tent material draped from pole to pole in a circus tent), which may tend to smooth out the sensations produced by the discrete nature of the embossed points, and (for example) make lines and curves feel continuous to a greater extent than would otherwise be the case.

While the use of discrete pins 21 with large rounded heads 31 as heretofore described produce a sensation of continuity comparable to that of embossed images on paper with the same pin spacing, there may be applications for which the additional smoothing effect of a continuous sheet is desirable. This can be implemented by placing a thin sheet of flexible material 101 between the image produced by the pins and the user's fingers (see FIG. 13). Holding the flexible sheet against the pins with a partial vacuum can produce an even closer approximation to the sensation of reading embossed images on paper. An additional benefit of this approach is a reduction in contamination of the internal components of the display by dirt and other substances introduced from the fingers and by environmental exposure.

A possible alternate use of a flexible sheet is the application of a tactile graphic array as a mold or form for production of a permanent record of a displayed image. As an example, the user interacts with the refreshable tactile graphic display system, and occasionally wants to save a copy of what is displayed for later reference or to transfer to another user who may not have a refreshable display. A thin sheet of thermoplastic material 103 is heated and placed against the display surface (see again FIG. 13). The material can be pressed or vacuum formed against the surface of the display until it cools and hardens, after which time it can be removed, and retains an image of what was displayed. This capability may also be helpful to a user who is performing design work or conducting research and needs simultaneous access to multiple tactile graphic images (more than can be shown on the refreshable display at one time). The use of the same surface for direct reading by the user and for production of hardcopies represents an additional convenience for the user.

A two-level display (each pin either extended or not extended) is sufficient for displaying lines, curves, and textured 2-dimensional surfaces, and thus provides the functionality of 2-dimensional graphics. For some users who have learned to interpret perspective, this may include the capability to display 2-D perspective drawings of 3-D objects. A higher level of tactile graphic representation would present a true three-dimensional tactile graphic object. An extended array tactile graphic display is not capable of presenting full 3-D tactile graphic images, but it can be used in an intermediate format that conveys some three-dimensional information. This format requires that the pins be settable to multiple levels, and the resulting tactile image is comparable to relief sculpture (with the requirement that there be no undercutting of the raised portions of the image). Relief in non-refreshable media such as plastic is currently used for accessibility purposes, but use is limited by cost (much higher than 2-level embossed paper) and volume storage requirements.

If a multiple-level display has large intervals between the allowed levels (required by some of the locking mechanisms described hereinabove), then the stepwise nature of the depth presented may impede the reading of the display. This difficulty may be alleviated by measures to smooth the apparent surface of the display, for example by use of a flexible sheet as described above and shown in FIG. 13. As described for two-level displays, a multi-level display can also be designed for occasional use as a form for molding of permanent copies of the image displayed, by the application of a heated thermoplastic sheet.

An extended array tactile graphic display must follow a specified sequence of actions in order to ensure correct operation and to prevent harm to the user or damage to the display. In production design it is desirable to include layer interlock mechanisms to make sure that the allowed operational sequences are followed. For example, in a display with a two-stage pin retention, a sensor should detect whether the pins are locked (e.g., sensing position of the pin locking mechanism employed) and no effort to set or reset the pins while the lock is engaged should be supported. If a roller or other device is passed over the reading surface to reset the pins, then a sensor should detect whether or not the user is currently touching the reading surface—this could be implemented by requiring the user to press buttons (and therefore remove the hands from the display), or by use of position detection sensors, or by requiring that a cover be placed over the display during reset, or by a combination of the above. The specific interlocks needed depend on the specific implementation details of the display.

For computer implementation of the array of this invention, the following is a normal sequence of operations. The user first issues a command for the display of a tactile graphic image. The system converts the graphical image to a format suitable for the display, e.g. raster or vector format, and if necessary converts the image to a map for setting of individual pins. The system determines that the pins are unlocked (if two-stage pin retention is used) and ready for setting. If there is an undesired image already on the display, the pins are reset. The selected pins are set to produce the desired tactile graphic image and, if two-stage pin retention is used, the pins are then locked. The user is given a signal that the display is ready to read and the user reads the display. If desired and if the display has the capability, a permanent hardcopy of the displayed image can be made. If the user so desires, one or more incremental additions can be made to the displayed image. If two-stage pin retention is used, the pins are unlocked before each incremental addition, then re-locked, and the user signaled that the display is again ready for reading. Finally, when the user signals that the displayed image is to be erased or replaced, if two-stage pin retention is used the pins are unlocked and the pins are reset to the default position. The display is now ready to display a new graphic image.

Computer control is not necessary for implementation of the extended tactile graphic array. There can be considerable value for accessibility in a low-cost device that lets the user draw and read tactile images, then erase the images to enable further drawing. To be economically attractive, a non-computer-driven implementation of this technology must be extremely low in cost. In this cost range, the favored method is likely to be pin pop-through (elastic sheet), with a user-operated roller to erase tactile images. In the simplest implementation, the user writes on the back of the display with a free hand version of the tracker (roller pen described previously), and the displayed tactile image is a mirror image of what was written by the user. It is possible to employ a two-step writing process that reverses the image a second time and provides the user with a non-mirrored image to view.

All mechanical systems exposed to the environment experience wear and sometimes need repair. It is therefore important to keep in mind the ability to refurbish or repair, when designing production devices. There is significant value to the intended users in designing a tactile graphic display so that some of the repairs can be carried out by a blind or visually impaired user; this must be balanced against the complexity of various types of repair and the additional production cost associated with user-serviceable designs. Specific features that can enhance the ability to repair devices using this invention include the ability to disassemble the stack that forms the display matrix, the ability to replace worn pins, and the ability to detach the display matrix from the driving mechanism.

There are many situations in which the user may want to interact with the graphic image displayed rather than entering all commands by other methods such as voice or keyboard. Examples include the interactive addition of elements to a drawing, and clicking on graphically displayed control buttons. A number of control mechanisms have been incorporated in graphic tablets for use by sighted users, and many of these are applicable for use with a tactile graphic display. The basic requirements are position detection and sensing that an action should be taken. Position detection could be performed by incorporating pressure sensors in the display if sensitive enough to operate with the pin locking mechanisms herein disclosed. Alternatively, ultrasonic or optical pickup could be utilized. The use of a stylus simplifies the detection of a command to perform an action, but since the user reads the display with the fingertips, there may be an advantage to implementation of a system that can be controlled by a fingertip on the display. A simple example of this would be optical detection of finger position, and acoustic pickup of a fingernail clicked at a selected point on the display.

A conventional optical scanner is a useful accessory for obtaining images to be represented on the tactile graphic display. An additional possibility is a tactile scanning device that collects tactile images of real objects, for immediate display or for storage and later playback.

It is possible to use a mechanical linkage (e.g. a buckle) for the pin locking mechanism that remains stable after locking without the need to supply power. With this type of lock, the display surface is essentially independent of the display driving and control systems until it is time to unlock the pins. Therefore, the extended array tactile graphic display can be configured with a detachable display surface that maintains a stable tactile graphic image on the detached surface. This capability provides two benefits to the user. First, the user may wish to work on a project that requires simultaneous access to more tactile graphic information than can be displayed on a single display surface of the size that the user possesses. Rather than pay the price of two or more complete displays, the user can pay for one display driving system and multiple display screens (or display matrices), and write each screen in turn until all the needed information is displayed on one or another of the screens. Second, if the display surface becomes defective due to damage or wear, the user can attach a replacement screen and send the defective screen away for repair, thus minimizing the amount of time that the user does not have access to a working display.

Since the non-computer-driven extended tactile graphic array could be used as a sketchpad for hand drawing, the addition of elements to sense the positions of the pins will allow the user to connect the array to a computer system and capture the tactile image drawn, for further processing or storage.

With computer driven applications, the user can make permanent hardcopies of displayed images by attaching a commercially available tactile graphic embosser to the computer system. Examples of applications are the desire of the user to simultaneously access multiple screens of images (similar to the use of detachable screens described above), and tactile image distribution, for example handouts for a class.

In an extended array tactile graphic display, the tactile image created on the display is a real physical structure that the user reads by moving the fingers over the surface. The realism of such a display is the extent to which the user can easily receive the intended tactile impressions from the display. A primary issue is the spatial resolution of the display, which affects the user's ability to perceive lines and curves as continuous objects. If future technological advances make higher pin resolutions practical, it is likely that displays using the higher pin resolutions will provide increased functionality, including a greater sense of realism and the ability to display more detailed tactile graphic images. Similarly for multi-level displays, the number of depth levels determine the amount of relief that can realistically be portrayed.

It is fortunate that generic drawings do not have to conform to a particular scale. If there is a need for the user to feel a particular feature of an image, then the image can be scaled (or zoomed) to the point at which the feature can be displayed with the resolution available on the display. In this sense, the amount of detail that can be shown on a tactile graphic display is more a function of the total number of pins than of the pin spacing, unless the pin spacing is significantly closer than 20 pins per linear inch.

While the primary intended use of the extended array tactile graphic display is the display of images, it is expected that many users will also want the display device to show Braille text in addition, for example Braille labels on portions of a diagram. Unlike graphics, Standard Braille text has specific preferred dimensions, which can not be exactly reproduced on a tactile graphic array unless the pin spacing of the array corresponds to those dimensions. The spacing between dots in a Braille cell, the spacing between Braille cells in a row, and the spacing between rows of Braille cells are all different, so Standard Braille can not be presented on a regular rectangular array. "Dithering" displayed Braille text (shifting the pin positions or using multiple pins to map the desired dimensions of the text to the pin array) is not recommended because the relative spacing of the dots in Braille is also very important, and the user needs to be able to feel each Braille dot as a distinct point. The most effective solutions appear to be: 1) position the pins in the layout of the extended array in the proper configuration to display Braille, with additional pins as needed to obtain relatively uniform pin spacing for graphics applications (as shown in FIG. 4), or 2) adjust the dimensions of the Braille text so that while it no longer exactly matches Standard Braille dimensions, the match is as close as can be achieved with the available pin array, and so that the individual Braille cells displayed can be clearly distinguished from the neighboring cells.

The driving algorithm to be used for the extended array tactile graphic display or this invention must consider conversion of images to the tactile domain. Tactile graphic images have significant differences from visual graphic images, because the sense of touch uses different methods from the sense of sight to detect, identify, and organize object features. The greatest priority for a tactile graphic display is to allow the identification of distinctive features such as lines, curves, and borders between regions, and to provided differentiation between different regions by means of tactile cues such as textures.

The first step in tactile display of a visually oriented image is to convert it to a format that displays well on the tactile display. Conversion of visual cues may include the use of varying line widths to convey emphasis. If the tactile display uses vector drawing to set the pins, then part of this conversion implements a way to efficiently express the desired image in terms of vectors.

The extended tactile graphic array is constrained to place the stimulus points at the physical locations of the pins 21 that make up the array. If the image to be displayed has features that are not exactly aligned with the pin array, then the driving algorithm must determine how these features are to be displayed. An example of such a decision is to offset the displayed features slightly to align them with the pins in the display array. Display of diagonal lines offers the choice of setting only those pins that fall exactly on the desired line (which may leave many gaps in the line and produce a result that is difficult to interpret as a line), or setting a sufficient number of pins to produce the perception of a continuous line, which may result in a slightly jagged (stair step) line that is of varying apparent width depending on the angle of the line relative to the layout of the pin array. These issues do not interfere with the production of usable tactile graphic images, however, and the effects can be reduced as advances in the technology permit design of the display with closer pin spacing.

If the tactile graphic array does not use a regular pin pattern (e.g., using instead an array which includes dots spaced for the display of Standard Braille), then the driving algorithm must take into account the physical locations of these pins in the array, unless the pins are set by vector drawing, in which case the driving algorithm is less sensitive to the physical pin layout.

As may be appreciated from the foregoing, apparatus and methods in accord with this invention provide new refreshable tactile graphics display technology and design concepts for implementation and use of extended tactile graphic arrays. For an extended tactile graphic array with thousands of pins, major cost saving can be achieved by using each actuator to drive multiple pins via a scanning process. A high-speed repetitive scan that continually refreshes all the pins is conceivable, and may provide benefits for the depiction of moving pictures, but the most cost effective approach at present is one in which a slower scan is used and the pins are retained in place when not being driven by the actuators. The pins are therefore set into place by the operation of the actuators, remain in place as they are read, and are later reset to a default position. The number of actuators needed can be reduced by a factor of hundreds or more compared to the conventional approach of one actuator per pin. It is possible utilizing the foregoing to provide a practical implementation in which an extended tactile graphic array is driven using only a single actuator.

The primary intended application for the apparatus and method of this invention is a computer driven refreshable tactile graphic array for the display of tactile images for blind and visually impaired users. The technology encompasses both two-level display (each pin either extended or not extended), and multi-level systems for the display of relief images. The display of Braille text (of either standard or non-standard dimensions) is an important additional function of this technology, and an alternate implementation with pin spacing for Braille can be optimized for Braille, with graphics as a secondary function. Implementation options include a display screen (or matrix) that can be removed while retaining the written tactile graphic image, a very low cost screen that is written directly by the user rather than by computer-controlled actuators, and a display that can also create permanent hardcopies of the displayed image.

What is claimed is:

1. An extended refreshable tactile graphic array apparatus for tactile display comprising:
a display surface having a pin array of at least hundreds of movable pins maintained thereat, said display surface configured so that pins in said pin array are retained at a selected extension above said display surface after an applied force is utilized to move said pins;
pin retention means configured for resisting forces applied during sensing of said display that are greater than said applied force; and
actuating means to apply said applied force for selectively moving pins in said pin array between at least first and second positions, a single actuator of said actuating means for moving multiple said pins in said pin array.

2. The apparatus of claim 1 wherein said actuating means includes a selected number of said single actuators to as few as one said single actuator, and wherein said pin retention means includes a movable locking sheet for maintaining establishment of positions of all said pins in said pin array without continued influence by said actuating means as a user senses the tactile display.

3. The apparatus of claim 1 wherein said pin array is configured in one of a rectangular pin array, a staggered pin array, and an array with pin spacing that includes a pattern configured for display of standard or nearstandard dimension Braille text so that said apparatus supports display of both standard or near-standard dimension Braille text and high resolution tactile graphics.

4. The apparatus of claim 1 wherein said actuating means includes a vector drawing mechanism in which said single actuator can be moved along specified vectors for selected movement of any of said pins to generate a tactile graphic image for the entire said pin array.

5. The apparatus of claim 1 wherein said pins include enlarged heads at one end of a shaft and surface features at said shaft cooperative with said pin retention means to enable control of pin position, and wherein said surface features are sufficient to allow each of pins to be moved to a selected one of a plurality of elevations with said enlarged heads a selected distance above said display surface.

6. The apparatus of claim 1 further comprising means for moving all of said pins to a default position.

7. The apparatus of claim 1 wherein said display surface and said pin retention means are mounted together in a stacked matrix, said stacked matrix detachable from said apparatus with a tactile graphic image displayed thereat maintained, whereby a user can use said actuating means with different stacked matrices to produce multiple display surfaces having different tactile graphic images thereat for simultaneous access.

8. An extended refreshable tactile graphic array apparatus for scanned tactile display comprising:
   a multiplicity of movable pins, each pin including a shaft between an enlarged head and an end;
   a matrix of stacked elements including a display surface element and a laterally movable pin retention element having a plurality of locations configured to engage said movable pins for locking said multiplicity of movable pins in a selected raised or lowered display position after said display is set, said display surface element having a user accessible display surface and an array of openings each having one of said movable pins maintained therein with said enlarged heads of said pins above said display surface and said pin ends below said display surface element, said display surface element formed at least at said openings so that pin extension relative to said user accessible display surface is retained without further support of said pins yet yields to change of pin extension upon application of an applied force; and
   actuating means for selectively contacting said pin ends after lateral movement of said pin retention element to release said multiplicity of movable pins from engagement and thereby to apply said applied force for moving pins maintained at said array of openings at said display surface element between at least first and second positions, a single actuator in said actuating means for moving a number of said pins.

9. The apparatus of claim 8 wherein said display surface element of said matrix of stacked elements is formed of a compressible material sheet, and wherein said pin retention element is a sheet, said plurality of locations comprising ovoid openings equal in number to said pins, each said pin extending through a different one of said ovoid openings and freely movable therethrough when said sheet is laterally moved to a first position, said pin captured in said ovoid openings when said sheet is moved to a second position thereby locking pin position.

10. The apparatus of claim 8 wherein said actuating means includes one of a one-dimensional scanned actuator array, a raster scanning array, or a vector drawing system.

11. The apparatus of claim 8 further comprising a flexible cover over said matrix of stacked elements at said display surface element, said enlarged heads of said pins bearing there against.

12. The apparatus of claim 8 further comprising one of a roller mechanism or a plate element in said matrix for movement of said pins to a default position preparatory to resetting the display.

13. The apparatus of claim 8 further comprising means for creation of permanent copies of a display at said display surface of said display surface element.

14. The apparatus of claim 8 wherein at least one of said display surface element and said pin retention element includes a plurality of clips arrayed at a unitary sheet.

15. A method for extended refreshable tactile graphic display comprising the steps of:
   maintaining an array of at least hundreds of movable pins at a display surface;
   using a single actuator to move multiple said pins in said array between at least first and second elevation positions relative to said display surface;
   continuing to move said pins until a desired configuration is attained at said display surface;
   retaining pins in a position when moved without continued influence from said actuator;
   locking said pins in position after attainment of said desired configuration; and
   unlocking said pin positions to allow movement of said pins utilizing force sufficient to overcome retention of pin position when desired to attain a different configuration at said display surface.

16. The method of claim 15 wherein the step of retaining moved pins in a position includes the step of configuring said display surface to hold said pins temporarily in place as selected said pins in said array are being moved, and wherein the step of locking said pins in position includes resisting forces applied that are greater than forces applied for moving said pins to attain said configurations at said display surface thereby to maintain establishment of pin positions as a user senses the tactile display.

17. The method of claim 15 wherein the steps of moving pins include moving said pins to a selected one of plural pin extension positions relative to said display surface to provide a tactile graphic relief display.

18. The method of claim 15 further comprising the step of making a copy of said desired configuration using a thermal sheet at said display surface.

19. The method of claim 15 wherein said steps are computer controlled and further comprise the steps of:
   receiving a user issued command for the display of a tactile graphic image;
   conversion of a selected graphical image to a format suitable for graphic display;
   determining that said pins are ready to be moved;
   if a tactile display is already set at said display surface, moving said pins to a default position after receiving said user issued command; and
   when signaled by the user, receiving another user issued command for display of a new tactile graphic image.

20. The method of claim 15 further comprising configuring said array of pins at said display surface for display of one of high resolution graphic images, standard or nearstandard dimension Braille text, or a combination thereof.

* * * * *